(12) United States Patent  
Temmerman

(10) Patent No.: US 8,879,373 B1
(45) Date of Patent: Nov. 4, 2014

(54) SYSTEMS AND METHODS FOR OPTIMIZING OPTICAL RECORDING

(71) Applicant: Marvell International Ltd., Hamilton (BM)

(72) Inventor: Jents D. Temmerman, Hove (BE)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/896,112

(22) Filed: May 16, 2013

Related U.S. Application Data

(60) Provisional application No. 61/658,192, filed on Jun. 11, 2012.

(51) Int. Cl.
  *G11B 7/00* (2006.01)
  *G11B 20/10* (2006.01)

(52) U.S. Cl.
  CPC .................. *G11B 20/10398* (2013.01)
  USPC ..................... 369/53.34; 369/44.28

(58) Field of Classification Search
  None
  See application file for complete search history.

(56) References Cited

U.S. PATENT DOCUMENTS

| | | | |
|---|---|---|---|
| 5,414,689 A * | 5/1995 | Maeda et al. | 369/59.11 |
| 6,982,939 B2 * | 1/2006 | Powelson et al. | 369/47.53 |
| 8,000,198 B2 * | 8/2011 | Shinotsuka et al. | 369/53.28 |
| 8,154,968 B1 * | 4/2012 | Foland, Jr. | 369/59.11 |
| 8,159,919 B1 * | 4/2012 | Kivits | 369/59.11 |
| 2007/0081445 A1 * | 4/2007 | Hibino et al. | 369/275.2 |

* cited by examiner

Primary Examiner — Peter Vincent Agustin

(57) ABSTRACT

Systems and methods are provided for reducing jitter in a write strategy for an optical drive. A pattern on an optical medium is recorded according to a first write strategy. Edge timings corresponding to the pattern recorded on the optical medium are measured, and edge timing sensitivities are determined based at least in part on the measured edge timings. A second write strategy is determined based on the edge timing sensitivities, such that the second write strategy is associated with a second jitter amount less than a first jitter amount associated with the first write strategy.

22 Claims, 10 Drawing Sheets

700a

| PRECEDING SPACE | MARK | | | |
|---|---|---|---|---|
| | 3 | 4 | 5 | 6 |
| 3 | 120 | 60 | 60 | 210 |
| 4 | 60 | 30 | 30 | 180 |
| 5 | 60 | 30 | 30 | 180 |
| 6 | 60 | 30 | 30 | 210 |
| 7 | 60 | 30 | 30 | 150 |
| 8 | 60 | 30 | | 120 |
| 9 | 60 | | | 120 |

FIG. 3A

| FOLLOWING SPACE | MARK | | | |
|---|---|---|---|---|
| | 3 | 4 | 5 | 6 |
| 3 | 60 | 30 | 30 | 330 |
| 4 | 60 | 30 | 30 | 180 |
| 5 | 60 | 30 | 30 | 180 |
| 6 | 60 | 30 | 30 | 210 |
| 7 | 60 | 30 | 60 | 120 |
| 8 | 60 | 60 | | 90 |
| 9 | 120 | | | 60 |

FIG. 3B

SYSTEMS AND METHODS FOR OPTIMIZING OPTICAL RECORDING

CROSS-REFERENCE TO RELATED APPLICATION

This application claims the benefit under 35 U.S.C. §119(e) of U.S. Provisional Application No. 61/658,192, filed Jun. 11, 2012, which is hereby incorporated by reference herein in its entirety.

FIELD OF USE

The present disclosure relates generally to optimizing recording for storage devices, and more particularly, to systems and methods for identifying optimal write strategy parameters for an optical drive.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Optical recording systems are used to write data to a surface of an optical storage medium, such as a CD or DVD. To write the data, laser pulses may be used to record marks and spaces on the medium. The recording quality, which may determine a quality of a reading compatibility, can be affected by properties of the optical recording system and the optical storage medium. To improve the recording quality, an optical recording system may perform a calibration procedure, such as an optimum power calibration (OPC) procedure, to obtain appropriate parameter values of laser pulses corresponding to a specific optical storage medium, before an actual recording of user data. Then, the optical recording system can use the laser pulses with the appropriate parameter values to perform the user data recording on the specific optical storage medium.

SUMMARY OF THE DISCLOSURE

In accordance with an embodiment of the disclosure, systems and methods are provided for reducing jitter in a write strategy for an optical drive. A pattern on an optical medium is recorded according to a first write strategy. Edge timings corresponding to the pattern recorded on the optical medium are measured, and edge timing sensitivities are determined based at least in part on the measured edge timings. A second write strategy is determined based on the edge timing sensitivities, such that the second write strategy is associated with a second jitter amount less than a first jitter amount associated with the first write strategy.

The second write strategy is determined by optimizing an error function based at least in part on the edge timing sensitivities. The optimizing comprises calculating a first order derivative of the error function with respect to the edge timing sensitivities and calculating a second order derivative of the error function with respect to the edge timing sensitivities. Optimizing the error function comprises identifying a minimum of the error function. The second jitter amount may be predicted based on the optimizing of the error function.

The edge timing sensitivities each indicate a predicted effect of a timing modification to a first edge timing on a second edge timing. The edge timing sensitivities may be represented as elements in a matrix with the first edge timing along a first matrix dimension and the second edge timing along a second matrix dimension.

The edge timing sensitivities are each characterized by at least two preceding portions and two following portions, each preceding portion and following portion corresponding to a mark or a space on the optical medium.

The edge timing sensitivities are each characterized by a polarity of the measured edge timings.

The second write strategy is determined by optimizing a cost function in accordance with:

$$\sum_{p=0}^{1} \sum_{ijkl=start}^{end} N_{pijkl}(E_{pijkl})^2 + \sum_{p=0}^{1} \sum_{ijkl=start}^{end} N_{pijkl}(\sigma_{pijkl})^2$$

where
 p denotes a polarity parameter of an edge;
 (i,j,k,l) denote run length parameters associated with the edge;
 $N_{pijkl}$ denotes a number of edges with parameters (p,i,j,k,l);

$$\sum_{ijkl=start}^{end} x_{ijkl}$$

denotes $$\sum_{i=start}^{end} \sum_{j=start}^{end} \sum_{k=start}^{end} \sum_{l=start}^{end} x_{ijkl};$$

$E_{pijkl}$ denotes a mean measured position of the $N_{pijkl}$ edges; and
 $\sigma_{pijkl}$ denotes a standard deviation of the $N_{pijkl}$ edges.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which:

FIGS. 3A-3B show exemplary tables for transitions between run lengths according to an embodiment of the present disclosure;

DETAILED DESCRIPTION

To provide an overall understanding of the disclosure, certain illustrative embodiments will now be described. However, the systems and methods described herein may be adapted and modified as is appropriate for the application being addressed and that the systems and methods described herein may be employed in other suitable applications, and that such other additions and modifications will not depart from the scope hereof.

Figure 1:
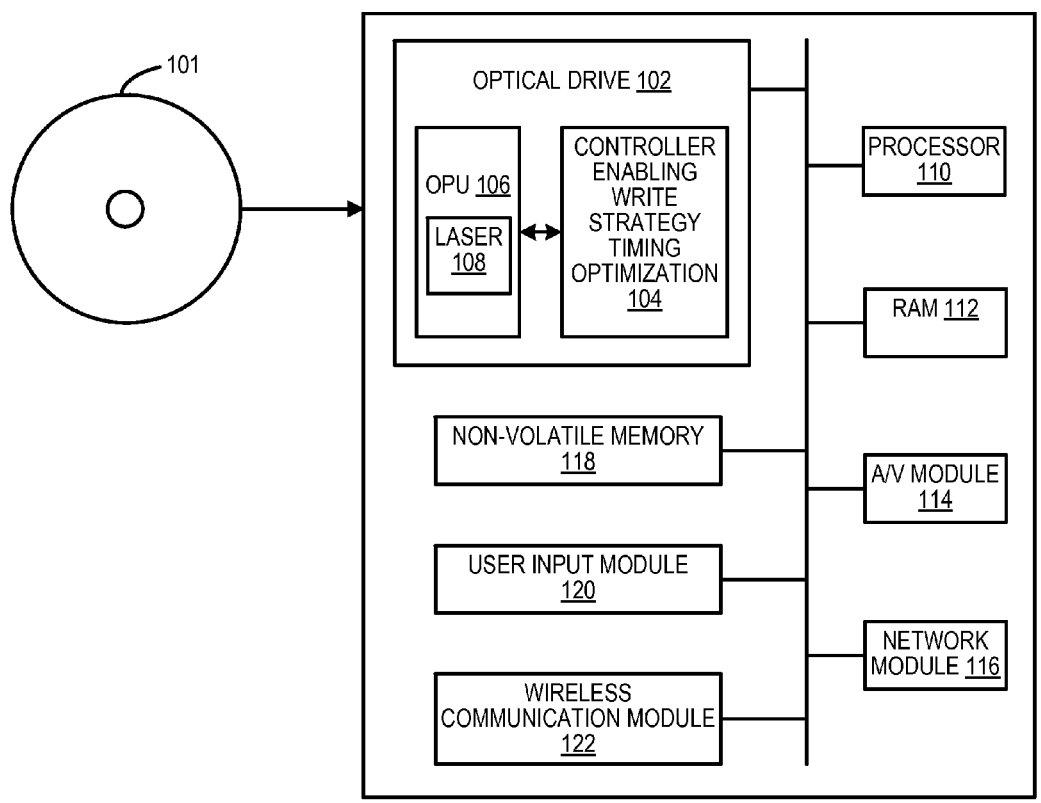
FIG. 1 shows a block diagram of an illustrative system for optimizing an optical recording, according to an embodiment of the present disclosure.

FIG. 1 shows a block diagram of an illustrative system 100 for optimizing an optical recording, in accordance with an embodiment of the disclosure. System 100 includes an optical drive 102, a processor 110, a random access memory (RAM) module 112, an audio/video (A/V) module 114, a network module 116, a non-volatile memory module 118, a user input module 120, and a wireless communication module 122. These components are coupled together as shown in system 100. Optical drive 102 includes a controller 104 and an optical pickup unit (OPU) 106 including a laser 108. Controller 104 is configured to enable optimization of a write strategy, as is described in more detail below. OPU 106 is configured to record data to a memory medium, such as optical disk 101, and can read the recorded data from the optical disk 101. The optical disk 101 stores data on a recording track in the form of marks and spaces. The marks and spaces may be referred to generally as run lengths.

Laser 108 can be controlled to record data on optical disk 101 in a recording process and can also be used to read the recorded data from the optical disk 101 in a reading process. During the recording process, OPU 106 controls laser unit 101 to emit high power laser pulses according to a write strategy and data to be recorded. The write strategy and/or the data to be recorded may be determined by controller 104, which transmits recording instructions to OPU 106. The write strategy may include write strategy parameters for the laser pulses, such as a laser pulse power, a pulse length, a pulse phase, a pulse interval, a switch speed, or any other suitable laser pulse parameter. The data to be recorded may be encoded according to one or more encoding schemes. According to the write strategy and the data to be recorded, the laser pulses are directed to a recording track of optical disk 101, causing selective changes to an optical property in the recording track. The optical property may be a reflectivity of optical disk 101, such that the recording track is in the form of run lengths, or marks and spaces.

During a reading process, laser 108 may be controlled to emit a low energy laser beam. The laser beam may be directed onto the recording track of optical disk 101. The laser beam may be reflected by the recording track, and the reflected laser beam may have a light intensity corresponding to an optical property of the recording track, such as reflectivity, for example. A detector may detect the light intensity of the reflected beam and generate an electrical signal (such as a voltage signal) corresponding to the light intensity. The electrical signal may have a property, such as an amplitude of the voltage signal, corresponding to the optical property of the recording track, which may be used to differentiate the run lengths (marks and spaces) on the recording track.

In some implementations, a coding scheme uses transitions between the run lengths to encode data. Using the transitions, rather than directly using marks and spaces to represent binary states, may be used to improve recording performance. For example, a non-return-to-zero inverted (NRZI) coding scheme may use transitions, including transitions from marks to spaces and/or transitions from spaces to marks, to encode "1", and use no-transitions to encode "0". The coding scheme based on the transitions may result in reduced DC noise and would thus improve recording performance.

The transitions between marks and spaces result in edges, such as voltage increase edges and voltage decrease edges, in the electrical signal generated by the detector as described above. The edges may be compared to a system clock to obtain edge timings, which may be used to decode the encoded data. In the NRZI example, timings of two adjacent edges may determine a number of zeros between two ones. Thus, timings for the laser pulses to record the transitions between the marks and spaces may have an effect on the recording performance.

Controller 104 enables a write strategy timing optimization process to determine an optimum write strategy for optical drive 102 to record data on optical disk 101. The write strategy timing optimization process may include initially recording a pre-defined pattern on optical disk 101 before an official recording. In particular, controller 104 may determine a first (or initial) write strategy and control laser 108 to record the pre-defined pattern for one time on optical disk 101 according to the first write strategy. The pre-defined pattern may include transitions under various contexts, such as various lengths of the run lengths (or marks and spaces). Further, controller 104 may control OPU 106 to read the recorded pattern from optical disk 101. Controller 104 may receive one or more electrical signals with edges corresponding to the transitions between spaces and marks. Controller 104 may measure edge timings and edge timing distributions for the various contexts with regard to a system clock.

In addition, controller 104 may use edge timing sensitivities (which may be in the form of a sensitivity matrix). The edge timing sensitivities may correspond to changes in edge timing based on changes in the write strategy, such as changes in the laser pulse timing. The edge timing sensitivities may be pre-determined, and can be stored in memory accessible by controller 104, such as in non-volatile memory 118 and/or RAM 112. Based on the edge timing distributions and the edge timing sensitivities, controller 104 determines the changes of the recording laser pulses that may substantially achieve edge timing targets. The above operations may only need to be executed once to obtain an optimum write strategy.

In some implementations, the edge timing sensitivities are in the form of edge timing changes with respect to shifts in transition location. Controller 104 first determines the shifts to achieve the edge timing targets, and then determines laser pulse parameters of a write strategy to achieve the desired transition location shifts. In some implementations, the edge timing sensitivity is in the form of changes in edge timing with respect to laser pulse timings of a write strategy. Then, controller 104 directly determines optimum laser pulse parameters of the write strategy.

To determine appropriate parameters for the write strategy, controller 104 performs an optimization technique based on the edge timing sensitivities. As an example, controller 104 may execute a method, such as method 600 or method 700a described in detail in relation to FIGS. 6 and 7A, respectively, to identify the optimal parameters. In particular, controller

104 may minimize a cost function based on the edge timing sensitivities. In some implementations, the cost function is representative of an amount of jitter associated with the write strategy. The jitter may correspond to an aggregate measure of a mean squared phase error between the edge timing targets and the edge timings that are read from optical disk 101.

Optical drive 102 may include various other components that may assist in recording and reading data on optical disk 101. As an example, OPU 106 may include one or more lenses for guiding the laser beam, and/or photodiodes for detecting the reflected light from the recording track of optical disk 101.

Non-volatile memory 118 may be configured to store data even when no power is delivered to system 100. Thus, non-volatile memory 118 may be used to store system and application codes, such as firmware. RAM 112 is readable and writable and generally has a fast access speed. Data and codes may be stored in RAM 112 during operation, such that processor 110 may access RAM 112 efficiently.

User input module 120 enables a user to control operations of system 100. User input module 120 may include various user input devices, such as a keyboard, mouse, touch screen, or any other suitable user input device. In addition, user input module 120 may further include one or more interfaces enabling external user input devices.

A/V module 114 may include various audio and video devices, such as a microphone, display screen, speaker, or any other suitable audio or video device. A/V module 114 may include one or more interfaces enabling external audio or video devices. In addition, A/V module 114 may be used to play audio data or video data that is stored on optical disk 101.

Network module 116 and wireless communication module 122 may enable system 100 to communicate with another system by receiving and transmitting data. In an example, received data from the external system may be used for recording to optical disk 101. In an example, data read from optical disk 101 may be transmitted to the external system via network module 116 and/or wireless communication module 122.

Figure 2:
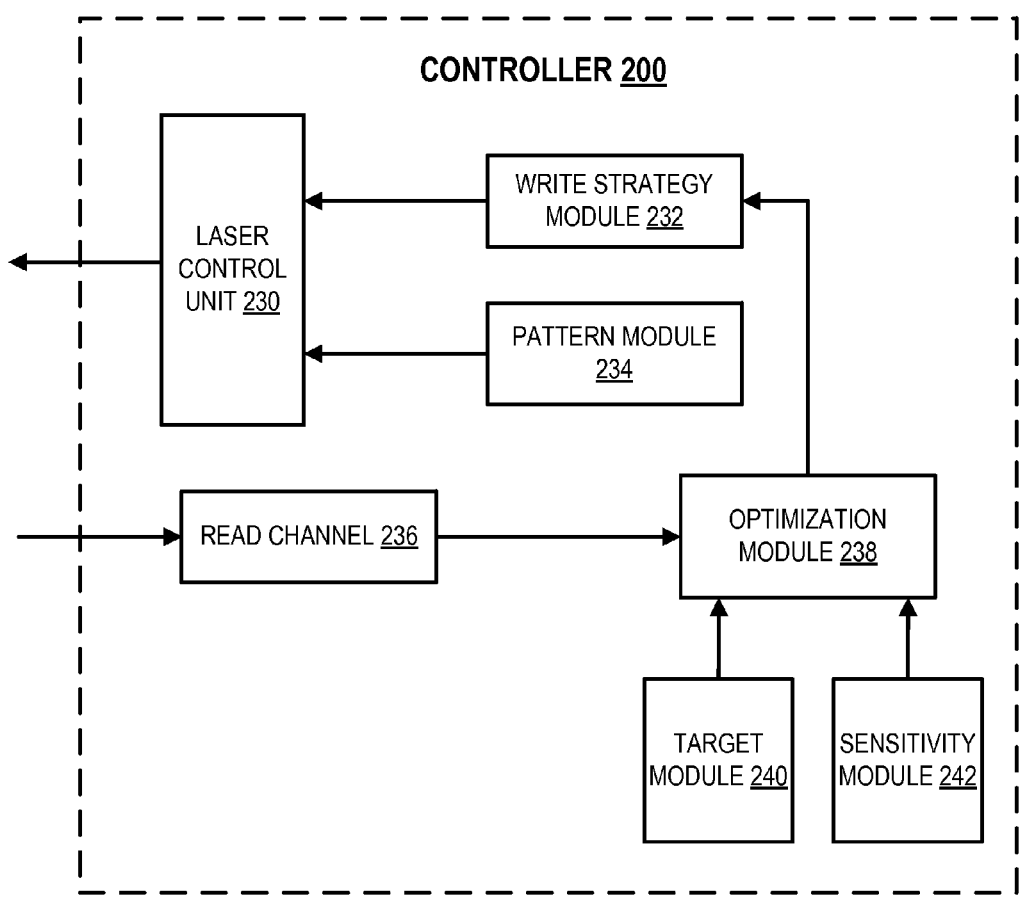
FIG. 2 shows a block diagram of an illustrative controller for determining appropriate parameters of a write strategy, according to an embodiment of the present disclosure.

FIG. 2 shows a block diagram of an illustrative controller 200 for determining appropriate parameters of a write strategy, in accordance with an embodiment of the disclosure. Controller 200 includes a laser control unit 230, a write strategy module 232, a pattern module 234, a read channel 236, an optimization module 238, a target module 240, and a sensitivity module 242. These elements are coupled together as shown in FIG. 2. Controller 200 may be the same as controller 104 in optical drive 102.

Write strategy module 232 includes various types of write strategies for laser pulses, such as block strategy, castle strategy, or any other suitable type of strategy. Each type of write strategy may include adjustable write strategy parameters. Write strategy module 232 provides a write strategy to laser control unit 230 for recording data onto an optical medium such as optical disk 101. Write strategy module 232 may include write strategy parameter registers for storing write strategy parameters. The write strategy parameters may be adjusted based on information received from optimization module 238. As an example, write strategy module 232 includes a table for a write strategy, the table including entries corresponding to various recording contexts, such as transitions between various run lengths of marks and spaces. Each entry of the table may include laser pulse parameters for recording the data to optical disk 101. In an example of a write strategy timing optimization process, write strategy module 232 initially provides a first (initial) write strategy with default parameter values to laser control unit 230. Write strategy module 232 may also provide a second (optimum) write strategy based on information or data received from optimization module 238.

Pattern module 234 provides a recording pattern to laser control unit 230. As an example, pattern module 234 provides a pre-defined pattern to laser control unit 230. The pre-defined pattern may include a number of occurrences for each transition context. Additionally, the pattern module 234 may convert data into a recording pattern and provide the recording pattern to laser control unit 230 for recording to optical disk 101.

Laser control unit 230 uses data received from write strategy module 232 and pattern module 234 to control a laser source based on the desired write strategy and the desired recording pattern. Specifically, the recording pattern is recorded on optical disk 101 according to the write strategy.

Read channel module 236 receives signals corresponding to patterns on optical disk 101 from OPU 106. As an example, read channel module 236 receives a voltage signal corresponding to a recorded pre-defined pattern on optical disk 101. Read channel module 236 may detect edges in the signal such as voltage increase edges and voltage decrease edges in the voltage signal. The edges correspond to transitions in the recorded pattern on optical disk 101. Then, read channel module 236 may measure edge timings with respect to a clock signal, such as a system clock signal. Additionally, read channel module 236 may analyze the edge timing distributions and provide the edge timing distributions and/or results of the analysis to optimization module 238. For example, an edge timing distribution may include a distribution of timing differences between edge timing targets and measured edge timings for multiple edges sharing a common characteristic. The characteristic may include a transition context, defined by the lengths of one or more preceding run lengths and the lengths of one or more following run lengths. In some implementations, read channel module 236 calculates statistics (such as a mean, standard deviation, variance, or any other suitable statistic) on the edge timing distributions and provides such statistics to optimization module 238. In some implementations, read channel module 236 provides the measured edge timings directly to optimization module 238, which calculates statistics on the edge timing distributions.

Optimization module 238 receives data indicative of the measured edge timings from read channel module 236. In addition, optimization module 238 may receive edge timing targets from target module 240 and edge timing sensitivities from sensitivity module 242. The edge timing targets correspond to desired edge timings, and the edge timing sensitivities represent changes of edge timings with respect to changes in the locations of the transitions. In some implementations, the edge timing targets is in the form of a target matrix, and the edge timing sensitivities are in the form of one or more sensitivity matrices. Optimization module 238 may determine adjustments to the transitions based on the edge timing distributions, the edge timing targets, and the edge timing sensitivities. In some implementations, optimization module 238 uses matrix calculations to calculate the transition adjustments. The transition adjustments are provided to write strategy module 232 to adjust the first (initial) write strategy accordingly. In an example, write strategy module 232 adjusts the write strategy registers that define the laser pulse parameters for recording the transitions, such that the adjustments of the laser pulses result in the desired adjustments in the recorded transitions between the run lengths (marks and spaces). The adjustments to the initial write strategy result in an optimal write strategy In some implementations, the elements of controller 200 are implemented in the form of software that is executed by a processor, such as processor 110. Alternatively, the elements of controller 200 may be implemented in the form of hardware, such as application specific integrated circuits (ASICs), or any other suitable hardware. In addition, the elements of controller 200 may be implemented in the form of a combination of software and hardware.

Figure 4:
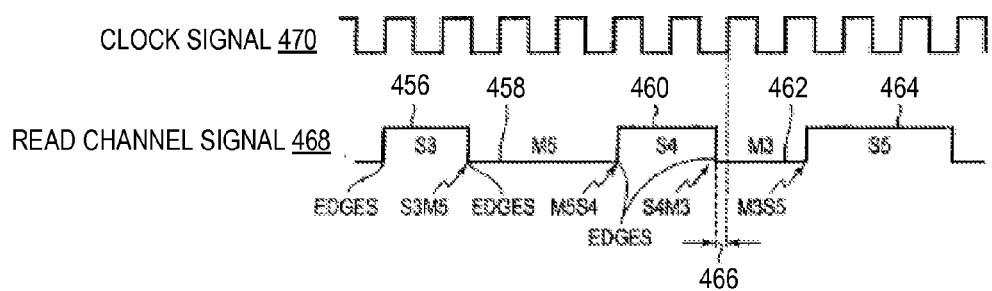
FIG. 4 shows a portion of an exemplary read channel signal and a clock signal, according to an embodiment of the present disclosure.

FIGS. 3A-3B show exemplary 2D tables for transitions between run lengths (spaces and marks), in accordance with an embodiment of the disclosure. Each table includes a number of edges in a recording track that share the same characteristic, defined by the rows and columns of the tables. In particular, FIG. 3A shows a summary table for transitions from spaces to marks. The summary table includes field 344 in column direction for lengths of a preceding space, and field 346 in row direction for lengths of marks. As shown in FIG. 4, the run lengths of spaces and marks are represented in terms of clock half-cycles but generally may be represented in terms of any suitable amount of time. Each element in the table of FIG. 3A indicates a number of occurrences of a specific transition context in the pre-defined pattern. The transition context is defined by a preceding space of a length indicated by field 344 and a mark of a length indicated by field 346. For example, element 348 indicates 60 occurrences of a transition from a space having a length corresponding to 4 clock half-cycles (i.e., S4) to a mark having a length corresponding to 3 clock half-cycles (i.e., M3). The transition (or edge) context corresponding to element 348 is referred to as "S4M3".

FIG. 3B shows a summary table for transitions from marks to spaces. The summary table includes field 350 in column direction for lengths of a following space, and field 352 in row direction for lengths of marks. As in FIG. 3A, each element in the table indicates a number of occurrences of a specific transition context in the pre-defined pattern. The transition context is defined by a following space of a length indicated by field 350 and a mark of a length indicated by field 352. For example, element 354 indicates 60 occurrences of a transition from a mark having a length corresponding to 3 clock half-cycles (i.e., M3) to a space having a length corresponding to 5 clock half-cycles (i.e., S5). The transition (or edge) context corresponding to element 354 is referred to as "M3S5".

FIG. 4 shows a portion of an exemplary read channel signal 468 and a clock signal 470, in accordance with an embodiment of the disclosure. Read channel signal 468 has high voltage portions corresponding to spaces on a recording track and low voltage portions corresponding to marks on the recording track. In particular, high voltage portions 456, 460, and 464 correspond to spaces S3, S4, and S5, respectively, and low voltage portions 458 and 462 correspond to marks M5 and M3, respectively. Read channel signal 468 includes rising edges corresponding to transitions from marks to spaces (i.e., MxSy) and falling edges corresponding to transitions from spaces to marks (i.e., SyMx). In general, a signal with an opposite polarity to read channel signal 468 may be used, such that high voltage portions correspond to marks and low voltage portions correspond to spaces.

In FIG. 4, the timings of the edges may be measured with respect to clock signal 470. For example, the edge timing corresponding to the edge between high voltage portion 460 and low voltage portion 462 may be measured by a timing difference 466. Furthermore, the edge timings corresponding to the edges or transitions may be statistically analyzed, such as by determining edge timing distributions and evaluating statistical parameters such as means and variances for the edges.

Figure 5:
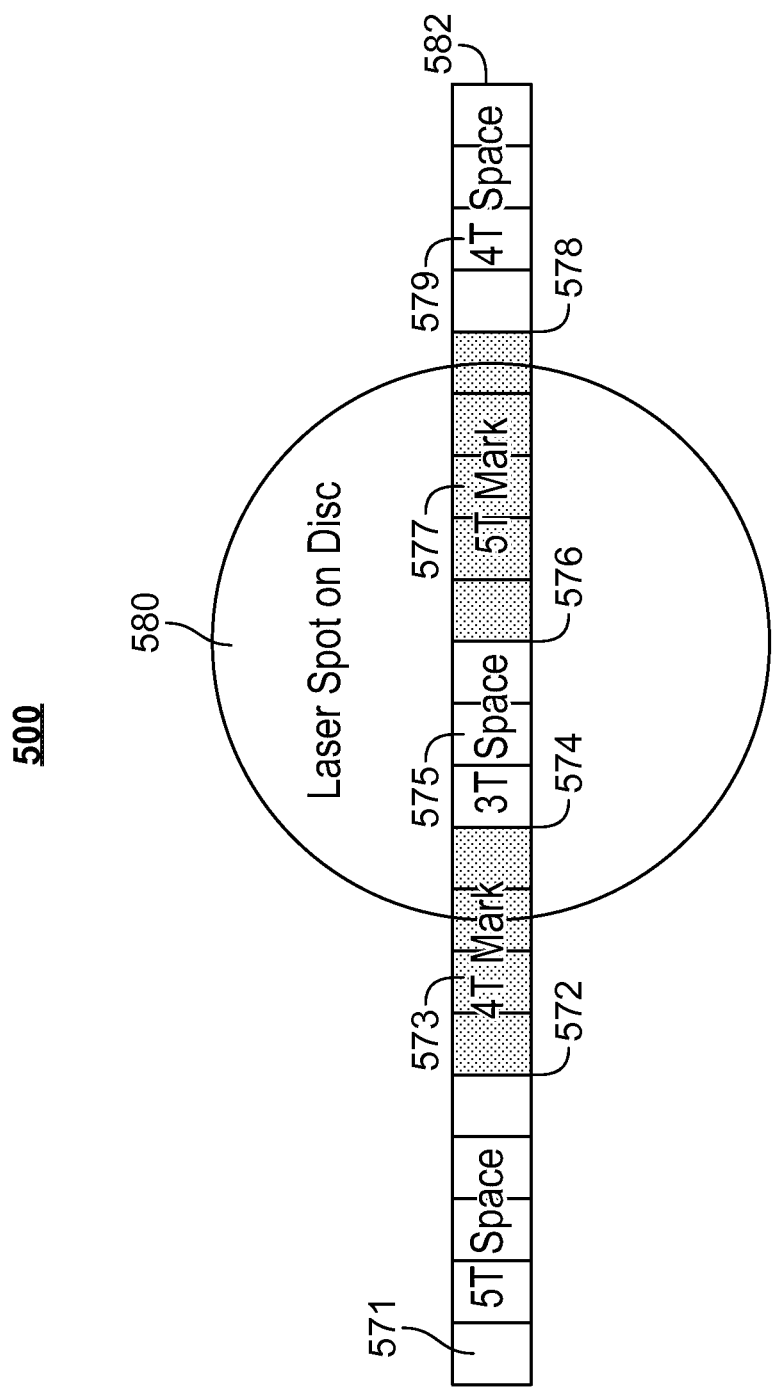
FIG. 5 shows a portion of an exemplary recording track and an exemplary laser spot, according to an embodiment of the present disclosure.

FIG. 5 shows a portion of an exemplary recording track 582 and an exemplary laser spot 580, in accordance with an embodiment of the disclosure. Laser spot 580 is reflected by recording track 582, such that the reflected laser has an intensity related to patterns on recording track 582. Recording track 582 includes five run lengths, including three spaces 571, 575, and 579 (with widths 5T, 3T, and 4T, respectively) and two marks 573 and 577 (with widths 4T and 5T, respectively). In particular, space 571 may be referred to as S5, mark 573 may be referred to as M4, space 575 may be referred to as S3, mark 577 may be referred to as M5, and space 579 may be referred to as S4. Recording track 582 also includes four edges 572, 574, 576, and 578.

In some implementations, each edge in recording track 582 is associated with a transition context defined by the preceding run length (mark or space) and the following run length (space or mark). As an example, edge 572 lies between space 571 and mark 573 and is associated with a transition context S5M4. Similarly, edge 574 is associated with a transition context M4S3, edge 576 is associated with a transition context S3M5, and edge 578 is associated with a transition context M5S4.

In some implementations, each edge in recording track 582 is associated with a transition context defined by the preceding two run lengths and the following two run lengths. That is, edge 574 is associated with a transition context S5M4S3M5, and edge 576 is associated with a transition context M4S3M5S4. In general, an edge may be associated with a transition context defined by any number of preceding run lengths and any number of following run lengths. The number of preceding run lengths may be the same or different from the number of following run lengths.

In the example of FIG. 5, laser spot 580 is substantially centered at edge 576, such that the intensity of the reflected laser may be related to a transition context of edge 576. However, the size of laser spot 580 may be comparable with the lengths of marks and spaces on recording track 582. Thus, other edges (such as edge 574, for example) may also affect the intensity of the reflected laser from edge 576. Accordingly, if the laser pulse timings for edge 574 changes, the detected edge timing of edge 576 may change. This change may be referred to as a sensitivity of one edge (i.e., edge 576) to a change in another edge (i.e., edge 574). The sensitivities defining relationships between each edge to every other edge may be combined to form a matrix, with each dimension of the matrix including a list of transition contexts associated with the edges. The matrix may be referred to as a sensitivity matrix, and the effect of changing one edge on another edge may be caused by an intersymbol interference (ISI) effect, a direct effect, or a thermal effect (where heat flows from one mark to another mark, interfering with the pit formation). In an example, the sensitivity matrix is a collection of ratios between all possible four-dimensional write strategy changes of the measured phase changes on all possible four-dimensional edges.

In some implementations, when using a two-dimensional transition context (i.e., defining the edges by the immediately preceding run length and the immediately following run length), adjusting the position of one or more edges tends to increase the variation in the other edges. As an example, changing the position of one edge (associated with a first transition context) may increase the standard deviation of an edge timing distribution associated with a different transition context. For example, a change to an edge denoted by M7S3 may have an ISI effect on the following edge (which may be denoted by S3Mx, where "x" is an integer from 3 to 11, for example). Thus, out of the S3Mx edges, a subset of those S3Mx edges (that are preceded by an M7) will experience the ISI effect from the change to the M7S3 edge, while the remaining S3Mx will not experience the same effect. Therefore, the standard deviation of the S3Mx may change. This example is described for illustrative purposes only, and one of ordinary skill in the art will understand that this can be applied to a change in any edge causing a change in standard deviation of other transition contexts.

In particular, a high standard deviation is associated with a high jitter amount, which is generally undesirable in an optical system. However, if the dimensionality of the transition context is increased (i.e., to four-dimensions to define an edge using the two immediately preceding run lengths and the two immediately following run lengths), adjusting the position of one or more edges may have less of an effect on the variation in the other edges, compared to the two-dimensional case. In particular, the effect of the ISI may reach approximately four channel bits. When the smallest run length is three channel bits, the ISI effect will not reach across two or more run lengths. Thus, collecting all edges based on the previous two run lengths and the next two run lengths into separate populations (i.e., taking a four-dimensional measurement map), then each four-dimensional edge of the same context is influenced by the same ISI effect. In this case, the ISI effect does not contribute to the standard deviations, and will be reflected in the differences in the means between the four-dimensional edges.

Figure 6:
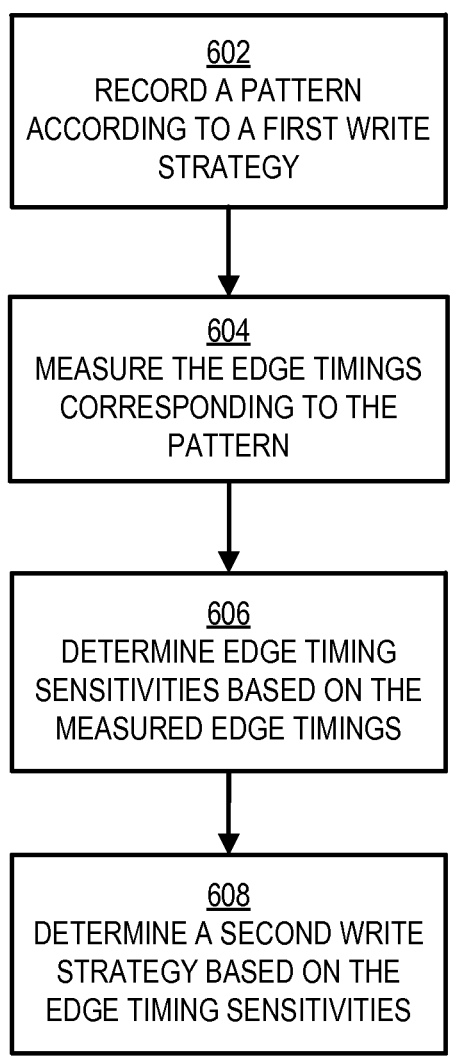
FIG. 6 shows a flow diagram of a method for identifying a modified write strategy, according to an embodiment of the present disclosure.

FIG. 6 shows a flow diagram of a method 600 for identifying a modified write strategy, in accordance with an embodiment of the disclosure. Method 600 includes recording a pattern according to a first write strategy (602), measuring the edge timings corresponding to the pattern (604), determining edge timing sensitivities based on the measured edge timings (606), and determining a second write strategy based on the edge timing sensitivities.

At 602, a pattern according to a first write strategy is recorded on an optical medium such as optical disk 101. The pattern may be pre-determined, and optical drive 102 may be used to record the pattern onto optical disk 101. The first write strategy is associated with a first jitter amount, where the first jitter amount corresponds to an aggregate measure of phase errors when the edges of the recorded pattern are read from optical disk 101.

At 604, the edge timings corresponding to the recorded pattern are measured. To measure the edge timings, optical drive 102 may use laser 108 to read the pattern from optical disk 101. Measuring the edge timings may involve comparing the read data to a clock signal such as clock signal 470 to identify timing differences such as timing difference 466. The timing differences may be combined across edges with the same or similar transition contexts to form distributions. Statistics, such as means and standard deviations, may be determined based on the distributions.

At 606, the edge timing sensitivities are determined based on the measured edge timings. To determine the edge timing sensitivities, a sensitivity matrix may be formed, where each element in the sensitivity matrix is representative of a change in a first edge timing along a first matrix dimension on a second edge timing along a second matrix dimension. A description of an example method to obtain the sensitivity matrix is described in detail in relation to FIGS. 7B-7C.

At 608, optimization module 238 determines a second write strategy based at least in part on the edge timing sensitivities. One way to determine the second write strategy is described in more detail in relation to FIG. 7A.

Figure 7A:
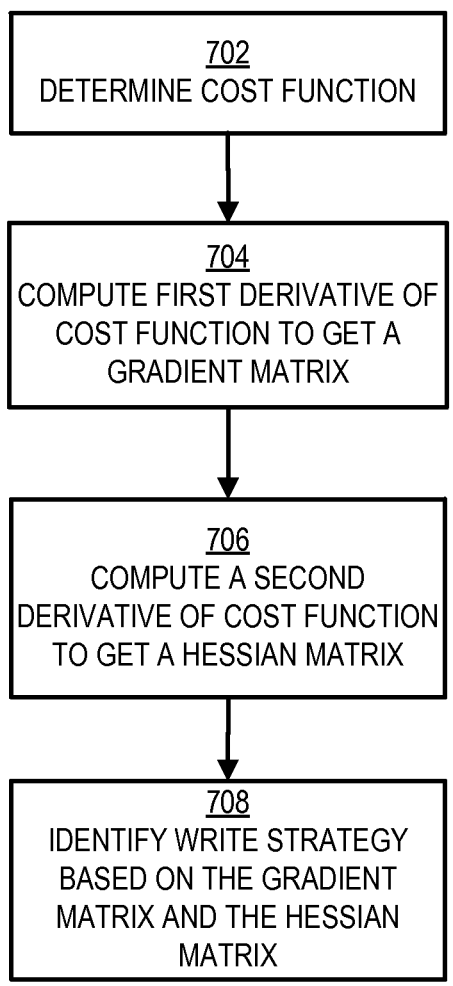
FIG. 7A shows a flow diagram of a method for identifying a write strategy based on an optimization scheme, according to an embodiment of the present disclosure.

FIG. 7A shows a flow diagram of a method 700a for identifying a write strategy based on an optimization scheme, in accordance with an embodiment of the disclosure. Method 700a includes determining a cost function (702), computing a first derivative of the cost function to derive a gradient matrix (704), computing a second derivative of the cost function to derive a Hessian matrix (706), and identifying a write strategy based on the gradient matrix and the Hessian matrix (708).

In particular, optimization module 238 is configured to determine proper parameters of an optimal write strategy such that the jitter associated with the optimal write strategy is improved relative to an initial write strategy. In an example, the optimal write strategy is determined by minimizing a cost function related to an amount of expected jitter.

At 702, optimization module 238 determines a cost function. In some implementations, the cost function is a mean squared phase error (MSPE) function that is dependent on the write strategy changes (i.e., from the initial write strategy to a candidate write strategy), a shift of a phase of a phase locked loop, and a matrix determined based on the measured edges. The phase locked loop may be used to keep the average of all phase measurements at zero. Thus, if one edge is changed in the write strategy table, then the phase shift of the phase locked loop may slightly influence all edge measurements and the resulting jitter. The cost (MSPE, for example) function is used to predict an aggregate error amount for a particular write strategy.

In an example, the cost function may be defined in accordance with:

$$MSPE = \frac{1}{N}\sum_{n=1}^{N} (\text{Edge}''_n)^2 \quad (1)$$

where

N=the total number of edges in a measurement, $\text{Edge}_n$=the $n^{th}$ edge in the measurement, and $\text{Edge}''_n$=the new position of $\text{Edge}_n$ after a change to the write strategy and taking into account the resulting shift of the phase of the phase locked loop. For any set of numbers $x_i$, this equation is valid:

$$\sum_{i=1}^{N} X_i^2 = N\overline{X}^2 + N\sigma_x^2$$

From this, it follows that the squared sum of all edges can be written as:

$$\sum_{n=1}^{N}(\text{Edge}''_n)^2 = \sum_{p=0}^{1}\sum_{ijkl=start}^{end} N_{pijkl}(E_{pijkl})^2 + \sum_{p=0}^{1}\sum_{ijkl=start}^{end} N_{pijkl}(\sigma_{pijkl})^2 \quad (2)$$

where $N_{pijkl}$ denotes the number of edges with parameters (p,i,j,k,l);

$$\sum_{ijkl=start}^{end} x_{ijkl}$$

denotes $$\sum_{i=start}^{end}\sum_{j=start}^{end}\sum_{k=start}^{end}\sum_{l=start}^{end} x_{i,j,k,l};$$

$E_{pijkl}$ denotes a mean measured position of the edges in the $N_{pijkl}$ edges; and $\sigma_{pijkl}$ denotes a standard deviation of the measured positions of the $N_{pijkl}$ edges.

In particular, $E_{pijkl}$ may be a measure of the $N_{pijkl}$ edges, each edge weighted by its occurrence in the EFM (eight to fourteen modulation, which is an encoding technique used in CDs, though in general, any encoding technique may be used), such that $E_{pijkl} = f_{pijkl} * e_{pijkl}$, where $$f_{pijkl} = \frac{N_{pijkl}}{N}$$

and $e_{pijkl}$ is the mean measured position of all the edges $E_{pijkl}$. Furthermore, the starts and ends of the run length parameters (i,j,k,l) may be all the same or different for the different parameters. As an example, each run length parameter may start at a value 3 and end at a value 11. These values are suitable for the EFM encoding scheme that are used in CD and DVD. For the rest of this disclosure, a start value of 3 and an end value of 11 will be used, but one of ordinary skill in the art will understand that in general, any start value and any end value may be used without departing from the scope of the disclosure. In some implementations, using a phase locked loop causes the mean position of the edges to be zero, such that: $\Sigma_{p=0}^{N}\Sigma_{ijkl=3}^{11}(E_{pijkl})=0$.

Changing a position of a first edge in the write strategy has an effect on other edges. In particular, the updated position of the first edge may have one effect on a second edge and a different effect on a third edge. The difference may arise from different ways that the second and third edges are related to the first edge. In an example, the second edge precedes the first edge while the third edge follows the first edge. In this case, the different relationships and effects may be categorized into different groups, such as direct shift, right shift, and left shift.

A direct shift may be defined as:

DirectShift$_{pijkl} = \Delta_{pijkl} * I_{pijkl,pijkl}$ (3)

where $\Delta_{pijkl}$ denotes a shift in time of the laser pulse while writing an $e_{pijkl}$ because of a change in write strategy on Edge$_{pijkl}$ and I is an influence matrix, where each element $I_{g,h}$ of the influence matrix is representative of an influence of edge with parameter(s) g on an edge with parameter(s) h. When the write strategy is two-dimensional (that is, when the write strategy is based on an immediately preceding run length (i.e., j) and an immediately following run length (i.e., k), it follows that $\Delta_{pijkl} = \Delta_{pmjkn}$, where m and n may correspond to any run length parameter. In general, the elements of the influence matrix may be defined as $$I_{pijkl,abcde} = \frac{(E'_{abcde} - E_{abcde})}{\Delta_{pijkl}},$$

where $E_{abcde}'$ denotes a new mean position of the edges with parameters (a,b,c,d,e) after a change to the write strategy, without taking into account a shift in the phase of the phase locked loop.

In some implementations, an ISI effect of an edge with polarity p influences edges with opposite polarity, or !p, such that several of the elements in the influence matrix I are zero:

$\forall p\in\{0,1\}, \forall i,j,k,l,b,c,d,e\in[3\ldots 11],(j\neq c)\vee(k\neq d):$
$I_{pijkl,pbcde}=0.$ In addition, an ISI effect may be zero for long and unrelated run lengths (greater than four half cycles, for example), such that:

$\forall p,q\in\{0,1\}, \forall i,j,k,l,b,c,d,e\in[3\ldots 11],p\neq q,(j>4)\wedge$
$(k>4):I_{pijkl,qbcde}=0$ In addition, for long run lengths (greater than four half cycles, for example) of the immediately preceding (i.e., j) and immediately following (i.e., k) run lengths, the element in the influence matrix is the same, regardless of the lengths of the run length preceding run length j and the run length following run length k:

$\forall p\in\{0,1\}, \forall i,j,k,l,a,b,c,d,m,n,o,r,e,f\in[3\ldots 11],(j>4)\wedge$
$(k>4):I_{pijkl,pajkd}=I_{pejkf,pmjkr}$ The cut-off value of four used for j and k may be related to the size of the laser spot, and in general may be any number.

The direct shift essentially indicates that moving an edge in the write strategy will move the same edge. As described above, moving one edge may also influence a preceding edge. This influence may be referred to as the right shift:

$$ISIRight_{pijkl} = \sum_{x=3}^{11} \Delta_{pxijk} * I_{\overline{p}xjkl,pijkl} * f_x \quad (4)$$

where $f_x$ denotes the occurrence of run length x, or $$\frac{N_x}{N}.$$

Additionally, moving one edge may influence a following edge. This influence may be referred to as the left shift:

$$ISILeft_{pijkl} = \sum_{y=3}^{11} \Delta_{pjkly} * I_{\overline{p}jkly,pijkl} * f_y \quad (5)$$

where $\overline{p}$ denotes not p.

Defining the direct shift, right shift, and left shift in accordance with Eqs. 3, 4, and 5, respectively, Eq. 2 may be rewritten as:

$$\sum_{n=1}^{N}(Edge_n'')^2 = \sum_{p=0}^{N}\sum_{ijkl=3}^{11} N_{pijkl}(Edge_{pijkl} + DirectShift_{pijkl} + \quad (6)$$
$$ISIRight_{pijkl} + ISILeft_{pijkl} + S)^2 + \sum_{p=0}^{N}\sum_{ijkl=3}^{11} N_{pijkl}(\sigma_{pijkl})^2$$

where

S denotes a change in the phase of the phase locked loop caused by a change in the write strategy. In some implementations, S is a constant and is the same for each edge, such that for each n:

Edge$_n''$=Edge$_n'$+S, and $e_{abcde}''=e_{abcde}'+S$.

Optimization module 238 then calculates the shift of a phase locked loop S. Defining polarities p and q and run length parameters i, j, k, and l:

$\forall p,q \in \{0,1\}, \forall i,j,k,l \in [3 \ldots 11], q=!p$:

The mean measured position of all edges, after a change to the write strategy but without taking into account any shift of the phase of the phase locked loop, may be written as:

$$e'_{pijkl}=e_{pijkl}+\text{DirectShift}_{p_m i_m j_m k_m l_m}+\text{IsiRight}_{p_m i_m j_m k_m l_m}+\text{IsiLeft}_{p_m i_m j_m k_m l_m} \quad (7),$$

and the mean measured position of all edges, after a change to the write strategy and with taking into account the phase shift of the phase locked loop, may be written as:

$$e''_{pijkl}=e_{pijkl}+\text{DirectShift}_{p_m i_m j_m k_m l_m}+\text{IsiRight}_{p_m i_m j_m k_m l_m}+\text{IsiLeft}_{p_m i_m j_m k_m l_m}+S \quad (8).$$

Multiplying both sides of Eq. 7 with $f_{pijkl}$, it follows that $\forall p,q \in \{0,1\}, \forall i,j,k,l \in [3 \ldots 11], q=!p$:

$$E'_{pijkl}=E_{pijkl}+\text{DirectShift}_{pijkl}*f_{pijkl}+\text{IsiRight}_{pijkl}*f_{pijkl}+\text{IsiLeft}_{pijkl}*f_{pijkl} \quad (9)$$

and performing the same operation to Eq. 8 results in:

$$E''_{pijkl}=E_{pijkl}+\text{DirectShift}_{pijkl}*f_{pijkl}+\text{IsiRight}_{pijkl}*f_{pijkl}+\text{IsiLeft}_{pijkl}*f_{pijkl}+S*f_{pijkl} \quad (10).$$

Adding all the edges together thus results in:

$$\Sigma_{p:0\to1}\Sigma_{ijkl:3\to11}E''_{pijkl}=\Sigma_{p:0\to1}\Sigma_{ijkl:3\to11}[E_{pijkl}+\text{DirectShift}_{pijkl}*f_{pijkl}+\text{IsiRight}_{pijkl}*f_{pijkl}+\text{IsiLeft}_{pijkl}*f_{pijkl}+S*f_{pijkl}]$$

and $$\Sigma_{p:0\to1}\Sigma_{ijkl:3\to11}E''_{pijkl}=\Sigma_{p:0\to1}\Sigma_{ijkl:3\to11}E_{pijkl}+\Sigma_{p:0\to1}\Sigma_{ijkl:3\to11}[\text{DirectShift}_{pijkl}*f_{pijkl}+\text{IsiRight}_{pijkl}*f_{pijkl}+\text{IsiLeft}_{pijkl}*f_{pijkl}]+\Sigma_{p:0\to1}\Sigma_{ijkl:3\to11}(S*f_{pijkl})$$

Because the phase locked loop ensures that:

$\Sigma_{p:0\to1;ijkl:3\to11}(E_{pijkl})=0$ and that:

$\Sigma_{p:0\to1;ijkl:3\to11}(E''_{pijkl})=0$, it follows that:

$0=\Sigma_{p:0\to1}\Sigma_{ijkl:3\to11}[\text{DirectShift}_{pijkl}*f_{pijkl}+\text{IsiRight}_{pijkl}*f_{pijkl}+\text{IsiLeft}_{pijkl}*f_{pijkl}]+S$ and solving for S results in:

$$S=-\Sigma_{p:0\to1}\Sigma_{ijkl:3\to11}f_{pijk}[\text{DirectShift}_{pijkl}+\text{IsiRight}_{pijkl}+\text{IsiLeft}_{pijkl}] \quad (11).$$

Thus, calculation of the shift S of the phase locked loop as a function of the changes in the four dimensional write strategy is complete.

Returning to the cost function, substituting the expression in Eq. 11 for S into Eq. 6 results in:

$$\sum_{n=1}^{N}(\text{Edge}_n'')^2 = \quad (12)$$

$$\sum_{p=0}^{1}\sum_{ijkl=3}^{11}N_{pijkl}(E_{pijkl}+C_{pijkl})^2 + \sum_{p=0}^{N}\sum_{ijkl=3}^{11}N_{pijkl}(\sigma_{pijkl})^2$$

where $C_{pijkl}=(1-f_{pijkl})(\text{DirectShift}_{pijkl}+\text{IsiRight}_{pijkl}+\text{IsiLeft}_{pijkl})$.

Eq. 12 may be rewritten as:

$$\sum_{n=1}^{N}(\text{Edge}_n'')^2 = \sum_{p=0}^{1}\sum_{ijkl=3}^{11}(N_{pijkl}E_{pijkl}^2) + 2\sum_{p=0}^{1}\sum_{ijkl=3}^{11}(N_{pijkl}E_{pijkl}C_{pijkl}) \quad (13)$$

$$+ \sum_{p=0}^{1}\sum_{ijkl=3}^{11}(N_{pijkl}C_{pijkl}^2) + \sum_{p=0}^{1}\sum_{ijkl=3}^{11}N_{pijkl}(\sigma_{pijkl})^2.$$

Thus, given a four dimensional ISI map measurement on a recording track with a known write strategy, Eq. 13 predicts a mean squared error that would be measured on another recording track written with any other known strategy. Optimization module 238 may optimize Eq. 13 by identifying suitable write strategy parameters that would minimize the right hand side of Eq. 13. In some implementations, to optimize Eq. 13, optimization module 238 computes the first and second order derivatives of Eq. 13.

At step 704, the first order derivative of the cost function determined at 702 is computed. The first order derivative of Eq. 13 may be taken with respect to $\Delta_{qrs}$, which denotes a shift in time of the laser pulse while writing an $e_{qrs}$ because of a change in write strategy on Edge$_{qrs}$. In particular, q represents a polarity of the edge, r represents the length of the preceding run length of the edge, and s represents the length of the following run length of the edge. Assuming the standard deviation of a four-dimensional edge is not dependent on a change to the write strategy (which may be confirmed for small changes in the write strategy), the first order derivative may be written as:

$$\frac{\partial \sum_{n:1\to N}(\text{Edge}_n)^2}{\partial \Delta_{qrs}} = \frac{\partial\left[\sum_{p:0\to1}\sum_{ijkl:3\to11}N_{pijk}(E_{pijkl})^2 + \sum_{p:0\to1}\sum_{ijkl:3\to11}N_{pijkl}(\text{Stdev}_{pijkl})^2\right]}{\partial \Delta_{qrs}}. \quad (14)$$

Because the standard deviation of an edge defined by four-dimensions is a constant, $$\frac{\partial\left[\sum_{p:0\to1}\sum_{ijkl:3\to11}N_{pijkl}(\text{Stdev}_{pijkl})^2\right]}{\partial \Delta_{qrs}} = 0.$$

It follows that:

$$\frac{\partial \sum_{n:1\to N}(\text{Edge}_n)^2}{\partial \Delta_{qrs}} = \frac{\partial\left[\sum_{p:0\to1}\sum_{ijkl:3\to11}N_{pijkl}(E_{pijkl})^2\right]}{\partial \Delta_{qrs}} = \quad (15)$$

$$2\sum_{p:0\to1}\sum_{ijkl:3\to11}[N_{pijkl}(E_{pijkl})]\frac{\partial E_{pijkl}}{\partial \Delta_{qrs}}$$

where:

$$\frac{\partial E_{pijkl}}{\partial \Delta_{qrs}} = \frac{\partial \left[ \sum_{p:0->1} \sum_{ijkl->11} ((1-f_{pijkl})(Directshift_{pijkl} + IsiLeft_{pijkl} + IsiRight_{pijkl})) \right]}{\partial \Delta_{qrs}}.$$

The first order derivative of the direct shift may be written as:

$$\frac{\partial (Directshift_{pijkl})}{\partial \Delta_{qrs}} = \frac{\partial (\Delta_{pijkl} * I_{pijkl,pijkl})}{\partial \Delta_{qrs}}.$$

Because the change in write strategy $\Delta_{pijkl}$ is a subset of the change in write strategy $\Delta_{qrs}$ when p is equal to q, j is equal to r, and k is equal to s, it follows that:

$$\frac{\partial (Directshift_{pijkl})}{\partial \Delta_{qrs}} = I_{pijkl,pijkl}((p==q)*(r==j)*(s==k))$$

$$(= I_{qirst,qirst}).$$

Furthermore, the first order derivative of the ISI left shift may be written as:

$$\frac{\partial (IsiLeft_{pijkl})}{\partial \Delta_{qrs}} = \frac{\partial \left( \sum_{x=3->11} (\Delta_{pxijk} * I_{pxijk,pijkl} * f_x) \right)}{\partial \Delta_{qrs}}, \text{ or}$$

$$\frac{\partial (IsiLeft_{pijkl})}{\partial \Delta_{qrs}} = \sum_{x=3->11} (I_{pxijl,pijkl} * f_x) * (\overline{p}==q)*(r==i)*(s==j).$$

Similarly, the first order derivative of the ISI right shift may be written as:

$$\frac{\partial (IsiRight_{pijkl})}{\partial \Delta_{qrs}} = \frac{\partial \left( \sum_{y=3->11} (\Delta_{pjkly} * I_{pjkly,pijkl} * f_y) \right)}{\partial \Delta_{qrs}},$$

or $$\frac{\partial (IsiRight_{pijkl})}{\partial \Delta_{qrs}} = \sum_{y=3->11} (I_{pjkly,pijkl} * f_y) * (\overline{p}==q)*(r==k)*(s==l).$$

Thus, the first order derivative of Eq. 13 may be written as:

$$\frac{\partial \sum_{n:1->N} (Edge_n)^2}{\partial \Delta_{qrs}} = \tag{16}$$

$$2 \sum_{p:0->1} \sum_{ijkl:3->11} \Big[ N_{pijkl}(E_{pijkl})((1-f_{pijkl})(I_{pijkl,pijkl}((p==q)*$$

-continued $$(r==j)*(s==k)) + \sum_{x=3->11} ((I_{\overline{p}xijk,pijkl} * f_x)*(\overline{p}==q)*(r==i)*$$

$$(s==j)) + \sum_{y=3->11} ((I_{pjkly,pijkl}*f_y)*$$

$$(\overline{p}==q)*(r==k)*(s==l))\Big]$$

Optimization module 238 may use Eq. 16 to build a gradient matrix of the cost function (or MSPE function) by calculating the result for all combinations or q, r, and s.

At 706, optimization module 238 computes a second derivative of the cost function determined at 702 to derive a Hessian matrix. The second order derivative of Eq. 13 with respect to $\Delta_{qrs}$ and $\Delta_{mnt}$ may be written as:

$$\frac{\partial \sum_{n:1->N}^2 (Edge_n)^2}{\partial \Delta_{qrs} \partial \Delta_{mnt}} =$$

$$2\frac{\partial \sum_{p:0->1} \sum_{ijkl:3->11} \Big[ N_{pijkl}(E_{pijkl})((1-f_{pijkl})(I_{pijkl,pijkl}((p==q)*}{(\partial \Delta_{mnt})}$$
$$(r==j)*(s==k)) + \sum_{x=3->11} ((I_{\overline{p}xijk,pijkl}*f_x)*(\overline{p}==q)*(r==i)*$$
$$(s==j)) + \sum_{y=3->11} ((I_{pjkly,pijkl}*f_y)*(\overline{p}==q)*(r==k)*(s==l))\Big]$$

In addition, because:

$$\frac{\partial E_{pijkl}}{\partial \Delta_{mnt}} = \frac{\partial \left[ \sum_{p:0->1} \sum_{ijkl:3->11} ((1-f_{pijkl})(Directshift_{pijkl} + IsiLeft_{pijkl} + IsiRight_{pijkl})) \right]}{\partial \Delta_{mnt}},$$

it follows that the second derivative may be written as:

$$\frac{\partial \sum_{n:1->N}^2 (Edge_n)^2}{\partial \Delta_{qrs} \partial \Delta_{mnt}} = \tag{17}$$

$$2 \sum_{p:0->1} \sum_{ijkl:3->11} \Big[ N_{pijkl} \Big( (1-f_{pijkl}) \Big( I_{pijkl,pijkl}((p==q)*$$

$$(r==j)*(s==k)) + \sum_{x=3->11} ((I_{\overline{p}xijk,pijkl}*f_x)*$$

$$(\overline{p}==q)*(r==i)*(s==j)) +$$

$$\sum_{y=3->11} ((I_{pjkly,pijkl}*f_y)*(\overline{p}==q)*(r==k)*s==l)\Big)*$$

$$\Big((1-f_{pijkl})\Big(I_{pijkl,pijkl}((p==m)*(n==j)*(t==k)) +$$

$$\sum_{x=3->11} ((I_{\overline{p}xijk,pijkl}*f_x)*(\overline{p}==m)*(n==i)*$$

-continued $$(t == j)) + \sum_{y=3->11} ((I_{\bar{p}jkly,pijkl} * f_y) *$$

$$(\bar{p} == m) * (n == k) * (t == l))\Big]$$

Optimization module 238 may use this equation to build a Hessian matrix of the cost function (or MSPE function). In particular, every write strategy change may be considered as a variable in the jitter model function. Then, the result of the formula may be calculated for all combinations of q, r, s, m, n, and t and the results are placed in a matrix.

At 708, optimization module 238 identifies an optimal write strategy based on the gradient matrix determined at 704 and the Hessian matrix determined at 706. In particular, optimization module 238 may use a Newton method, quasi-Newton method, gradient descent, or any other suitable optimization process for determining one or more local minima of the cost function. For example, in a Newton method, the Hessian matrix may be inverted and the inversion multiplied by the gradient matrix to yield a next iteration of the write strategy with improved jitter. In some implementations, computing the inverse of the Hessian matrix is computationally expensive. In this case, the quasi-Newton method may be used to identify a local minimum without computing the Hessian matrix. The quasi-Newton method is advantageous because matrix inversion is not required, and fixed point calculations, which are faster than floating point calculations, may be used.

Figure 7B:
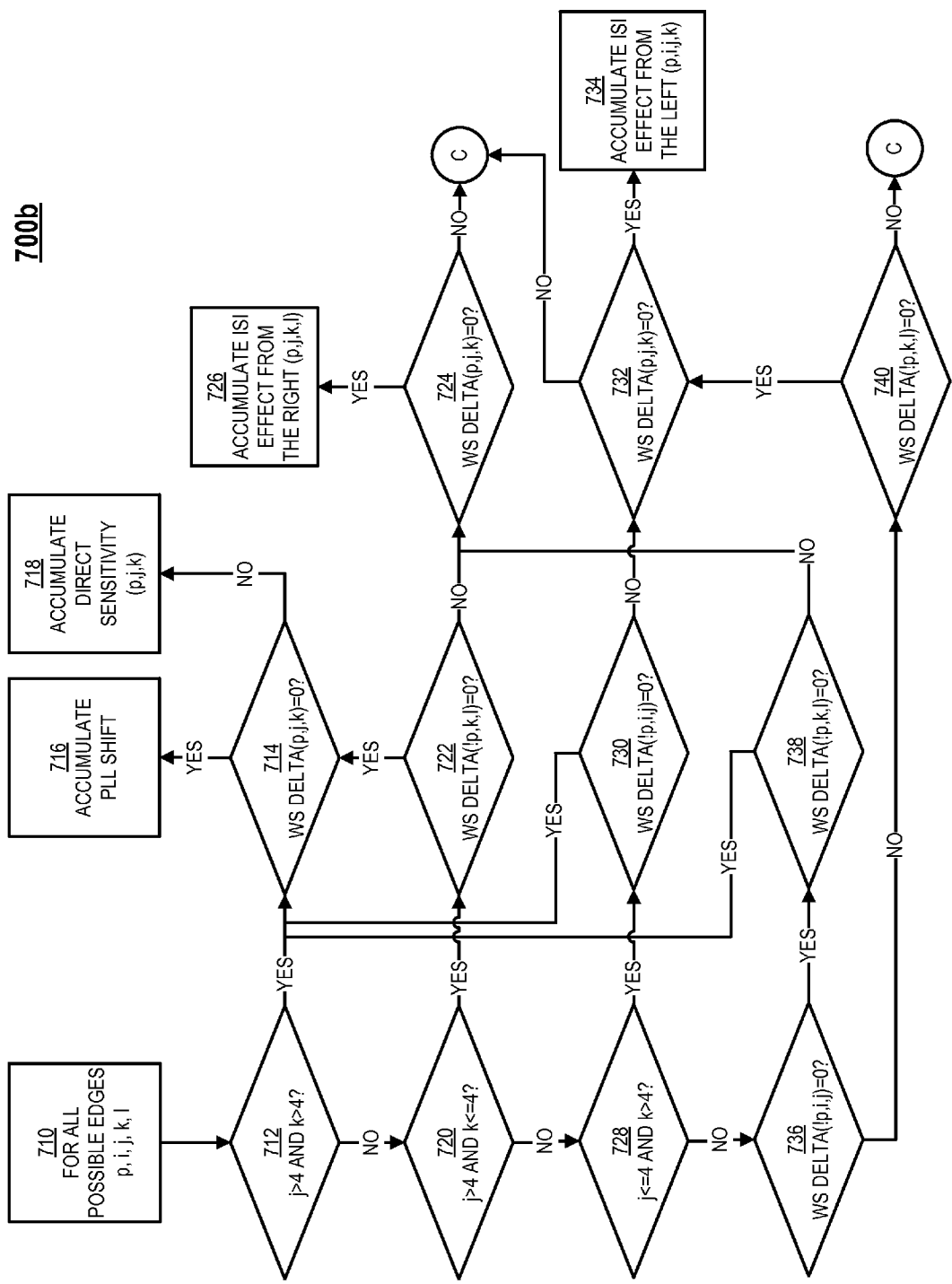
FIGS. 7B and 7C show flow diagrams of methods for identifying a sensitivity matrix, according to an embodiment of the present disclosure.
Figure 7C:
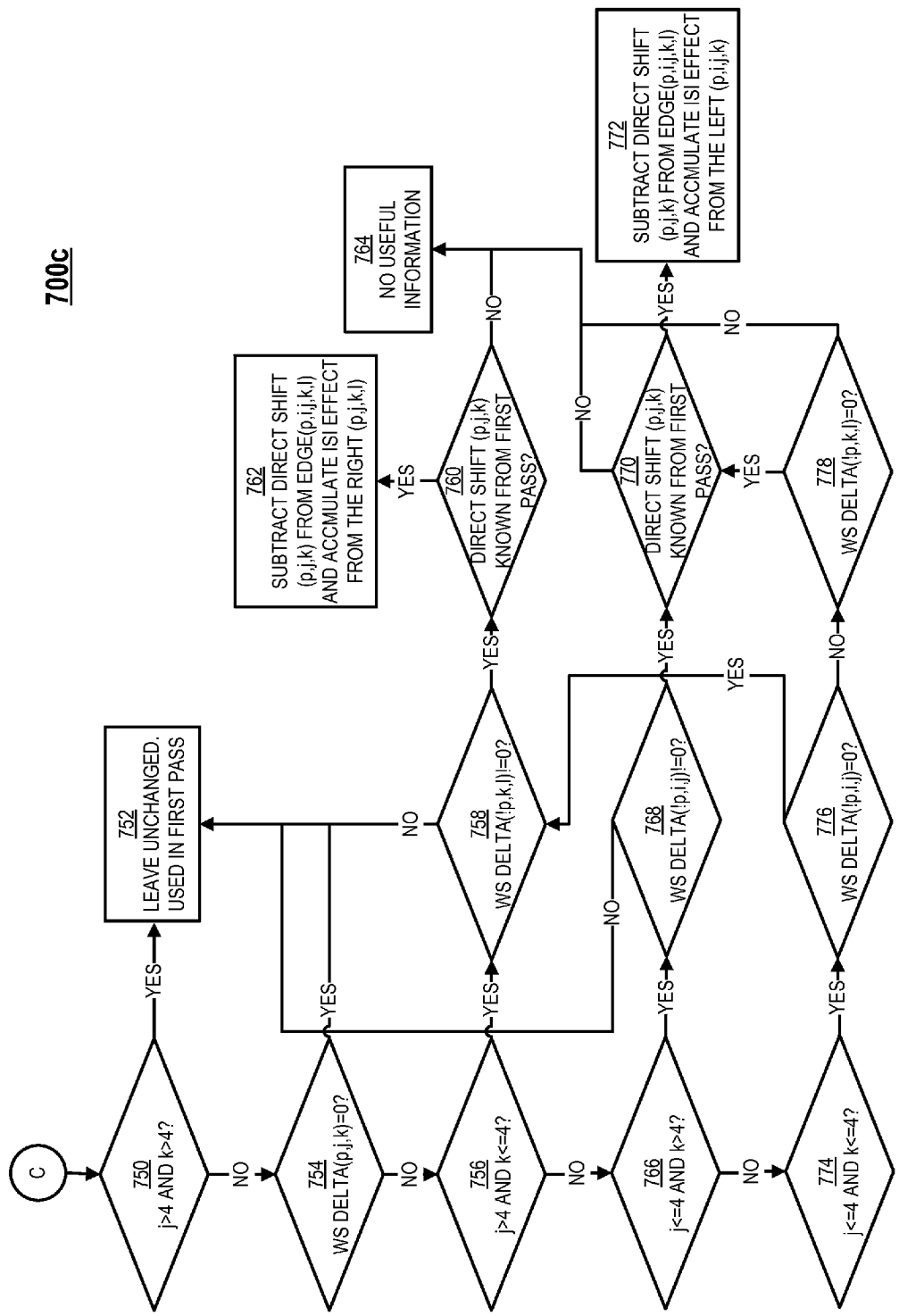

FIGS. 7B and 7C show flow diagrams of methods 700b and 700c for obtaining a sensitivity matrix, in accordance with an embodiment of the disclosure. In an example, the sensitivity matrix may have a dimension of 10 (corresponding to two edges, each edge defined by a polarity, two previous run lengths, and two following run lengths). While it is unpractical to consider a matrix with $2^2 9^8$ elements, some assumptions, which are valid for CD and DVD, may be made. In particular, direct shift effects of the edges may be assumed to be only dependent on the previous run length, the next run length, and the polarity. In this case, a write strategy change to a rising edge will only directly influence rising edges, and vice versa. It is further assumed that direct shift sensitivities for run lengths between three and five are used and that run lengths of five and larger have the same direct shift sensitivity. Another assumption that may be made relates to ISI effects. In particular, ISI effects may be assumed to be dependent on the three run lengths surrounding two edges (i.e., the influencing edge and the influenced edge) and the polarity. In this case, a write strategy change to a falling edge will influence a rising edge, and vice versa. It is further assumed that the ISI sensitivity is zero when the middle run length (across which the ISI effect takes place) is larger than 4T.

Taking the above assumptions into account, it is possible to measure the sensitivity matrix after just a single test write with a test strategy. The test strategy may be chosen to allow for all the sensitivities to be measured. In particular, by selecting the average shift of all edges to be approximately zero, the phase shift of the phase locked loop may be kept small. In some implementations, to further reduce the phase shift of the phase locked loop, the changed edges and the influenced edges may be excluded from being provided to the phase locked loop during the measurement.

When the four-dimensional data is available (i.e., stored in an array of Edges(p,i,j,k,l) as described above), the sensitivities may be determined by performing two passes through the data. Based on different values for the parameters j, k, and various pulse shifts $\Delta_{pjk}$, $\Delta_{pij}$, and $\Delta_{pkl}$, different effects may be accumulated, such as the phase shift from the phase locked loop, the direct shift sensitivity, the ISI shift from the right, and/or the ISI shift from the left. After the first pass, at least one of these phases may be accumulated for a subset of the parameter values. The first pass is described in relation to method 700b. In the second pass, depending on the parameter values, some of the phase values accumulated in the first pass may be left alone, or the direct shift may be subtracted from the edge. The second pass is described in relation to method 700c.

In method 700b, each possible edge denoted by (p,i,j,k,l) is considered (710). When the first pass is complete, several values of the sensitivity matrix are missing, and the second pass (described in method 700c) may be used to fill in the missing values. In an example, an ISI effect from the left effect of an S3M3 edge on the next edge M3S3 might not be measured because the write strategy of S3M3 and M3S3 may have been changed. Performing a second pass may resolve this issue by identifying those S3M3 edges that were not preceded nor followed by a run length of S3 or S4 (e.g., like an edge M6S3M3S6, for example). In this case, during the first pass, the direct shift of an S3M3 edge is obtained, and during the second pass, the direct shift effect may be subtracted from the edges S3M3 that were followed by S3 (e.g., S3M3S3). By subtracting the direct shift effect, the pure ISI effect of an edge S3M3 on S3 remains. In the first pass, each possible edge is considered based on various possible values of j and k.

When j and k are each greater than 4 (712) and if $\Delta_{pjk}$ (denoting a shift in time of the laser pulse while writing an $e_{pjk}$ because of a change in write strategy on $Edge_{pjk}$) is zero, then the phase shift of the phase locked loop is accumulated (716). Otherwise, when j and k are each greater than 4 (712) and $\Delta_{pjk}$ is not zero, the direct sensitivity is accumulated (718). When j is greater than 4 and k is less than or equal to 4 (720), and if $\Delta_{t_{pjk}}$ is zero (722), method 700b proceeds to 714 to determine whether $\Delta_{pjk}$ is zero to determine whether to accumulated the phase shift from the phase locked loop (716) or to accumulate the direct sensitivity (718). Otherwise, if $\Delta_{t_{pjk}}$ is not zero (722), method 700b proceeds to 724 to determine whether $\Delta_{pjk}$ is zero to determine whether to accumulate the ISI effect from the right (726) or to proceed to method 700c to perform the second pass.

When j is less than or equal to 4 and k is greater than 4 (728), if $\Delta_{t_{pij}}$ is zero (730), method 700b proceeds to 714 to determine whether $\Delta_{pjk}$ is zero to determine whether to accumulated the phase shift from the phase locked loop (716) or to accumulate the direct sensitivity (718). Otherwise, if $\Delta_{t_{pij}}$ is not zero (730), method 700b proceeds to 732 to determine whether $\Delta_{pjk}$ is zero, where if so, then the ISI effect is accumulated from the left (734). If $\Delta_{pjk}$ is not zero, then method 700c is used to perform the second pass.

For the remaining values of j and k (i.e., when j and k are both less than or equal to 4), if $\Delta_{t_{pij}}$ is zero (736) and if $\Delta_{t_{pkl}}$ is also zero (738), then method 700b proceeds to 714 to determine whether $\Delta_{pjk}$ is zero to determine whether to accumulated the phase shift from the phase locked loop (716) or to accumulate the direct sensitivity (718). However, if $\Delta_{t_{pij}}$ is zero (736) and $\Delta_{t_{pkl}}$ is not zero (738), method 700b proceeds to 724 to determine whether $\Delta_{pjk}$ is zero to determine whether to accumulate the ISI effect from the right (726) or to proceed to method 700c to perform the second pass. If $\Delta_{t_{pij}}$ is not zero (736) and $\Delta_{t_{pkl}}$ is zero (740), method 700b proceeds to 732 to determine whether $\Delta_{pjk}$ is zero, where if so, then the ISI effect is accumulated from the left (734) and where, if not, method 700c is used to perform the second pass. If $\Delta_{t_{pij}}$ is not zero (736) and $\Delta_{t_{pkl}}$ is also not zero (740), method 700c is used to perform the second pass.

In the second pass, various values of j and k are again considered in turn. In particular, when j and k are both greater than 4 (750), or when j and k are not both greater than 4 (750) but $\Delta_{pjk}$ is zero, method 700c proceeds to 752 to leave the data unchanged. The data is also unchanged when j is greater than 4, k is less than or equal to 4 (756), and when $\Delta_{t_{pkl}}$ is zero (758). However, when $\Delta_{t_{pkl}}$ is not zero (758), and if the direct shift (p,j,k) is known from the first pass, then the direct shift (p,j,k) is subtracted from Edge(p,i,j,k,l) and the ISI effect is accumulated from the right (p,j,k,l) (762).

The data is also unchanged when j is less than or equal to 4, k is greater than 4 (766), and $\Delta_{t_{pij}}$ is zero (768). However, when $\Delta_{t_{pij}}$ is not zero (768), and if the direct shift (p,j,k) is known from the first pass, then the direct shift (p,j,k) is subtracted from Edge(p,i,j,k,l) and the ISI effect is accumulated from the left (p,i,j,k) (772). If j and k are both less than or equal to 4 (774) and $\Delta_{t_{pij}}$ is zero (776), method 700c proceeds to 758 to determine whether $\Delta_{t_{pkl}}$ is zero or not to determine whether to use the direct shift known from the first pass (760) or to leave the current value unchanged (752). If j and k are both less than or equal to 4 (774), $\Delta_{t_{pij}}$ is not zero (776), and $\Delta_{t_{pkl}}$ is zero (778), the method 700c proceeds to 770 to determine whether the direct shift (p,j,k) is known from the first pass to determine whether to subtract the direct shift and accumulate the ISI effect from the left (772). Alternatively, if $\Delta_{t_{pkl}}$ is not zero, there is no additional useful information to be obtained in the second pass (764).

One or more additional techniques may be used to translate the arrays that result from the first and second passes back into sensitivity values for the sensitivity matrix. In an example, a direct shift technique may be applied. In this case, the direct sensitivity of an Edge(q,a,b,c,d) and $\Delta_{pijkl}$ may be aligned such that p=q, b=j, and c=k, such that when the values are aligned, the direct shift sensitivity (p,j,k) is returned. Otherwise, when the values are not aligned as described, a value of zero is returned. In another example, an ISI influence from the left technique may be applied. In this case, the ISI from the left sensitivity of an Edge(q,a,b,c,d) and $\Delta_{pijkl}$ may be aligned such that p=!q, a=j, b=k, and l=c, such that when the values are aligned, the ISI sensitivity from the left (p,j,k,l) is returned. Otherwise, when the values are not aligned as described, a value of zero is returned. In another example, an ISI influence from the right technique may be applied. IN this case, the ISI from the right sensitivity of an Edge (q,a,b,c,d) and $\Delta_{pijkl}$ may be aligned such that p=!q, b=i, c=j, and d=k, such that when the values are aligned, the ISI sensitivity from the right (p,i,j,k) is returned. Otherwise, when the values are not aligned as described, a value of zero is returned.

Figure 8:
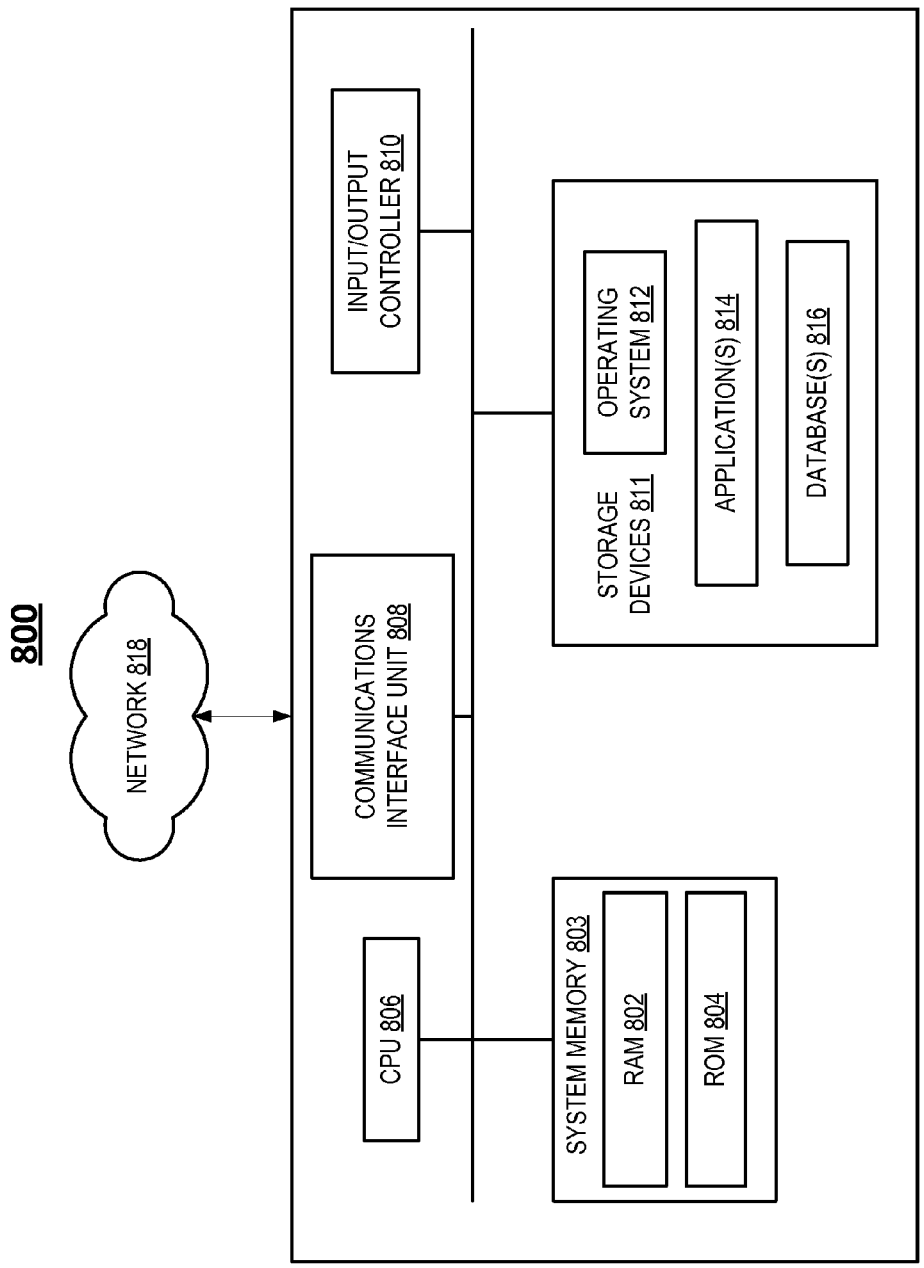
FIG. 8 shows a block diagram of a computing device for performing any of the processes described herein, according to an embodiment of the present disclosure.

FIG. 8 shows a block diagram of a computing device, such as any of the components of the systems of FIG. 1 or 2, for performing any of the processes described herein, in accordance with an embodiment of the disclosure. Each of the components of these systems may be implemented on one or more computing devices 800. In certain aspects, a plurality of the components of these systems may be included within one computing device 800. In certain implementations, a component and a storage device 811 may be implemented across several computing devices 800.

The computing device 800 comprises at least one communications interface unit 808, an input/output controller 810, system memory 803, and one or more data storage devices 811. The system memory 803 includes at least one random access memory (RAM 802) and at least one read-only memory (ROM 804). All of these elements are in communication with a central processing unit (CPU 806) to facilitate the operation of the computing device 800. The computing device 800 may be configured in many different ways. For example, the computing device 800 may be a conventional standalone computer or alternatively, the functions of computing device 800 may be distributed across multiple computer systems and architectures. In FIG. 8, the computing device 800 is linked, via network 818 or local network, to other servers or systems.

The computing device 800 may be configured in a distributed architecture, wherein databases and processors are housed in separate units or locations. Some units perform primary processing functions and contain at a minimum a general controller or a processor and a system memory 803. In distributed architecture implementations, each of these units may be attached via the communications interface unit 808 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 806 comprises a processor, such as one or more conventional microprocessors and one or more supplementary co-processors such as math co-processors for offloading workload from the CPU 806. The CPU 806 is in communication with the communications interface unit 808 and the input/output controller 810, through which the CPU 806 communicates with other devices such as other servers, user terminals, or devices. The communications interface unit 808 and the input/output controller 810 may include multiple communication channels for simultaneous communication with, for example, other processors, servers or client terminals.

The CPU 806 is also in communication with the data storage device 811. The data storage device 811 may comprise an appropriate combination of magnetic, optical or semiconductor memory, and may include, for example, RAM 802, ROM 804, flash drive, an optical disc such as a compact disc or a hard disk or drive. The CPU 806 and the data storage device 811 each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 806 may be connected to the data storage device 811 via the communications interface unit 808. The CPU 806 may be configured to perform one or more particular processing functions.

The data storage device 811 may store, for example, (i) an operating system 812 for the computing device 800; (ii) one or more applications 814 (e.g., computer program code or a computer program product) adapted to direct the CPU 806 in accordance with the systems and methods described here, and particularly in accordance with the processes described in detail with regard to the CPU 806; or (iii) database(s) 816 adapted to store information that may be utilized to store information required by the program.

The operating system 812 and applications 814 may be stored, for example, in a compressed, an uncompiled and an encrypted format, and may include computer program code. The instructions of the program may be read into a main memory of the processor from a computer-readable medium other than the data storage device 811, such as from the ROM 804 or from the RAM 802. While execution of sequences of instructions in the program causes the CPU 806 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to identifying an appropriate write strategy for an optical medium as described herein. The program also may include program elements such as an operating system 812, a database management system and "device drivers" that allow the processor to interface with computer peripheral devices (e.g., a video display, a keyboard, a computer mouse, etc.) via the input/output controller 810.

The term "computer-readable medium" as used herein refers to any non-transitory medium that provides or participates in providing instructions to the processor of the computing device 800 (or any other processor of a device described herein) for execution. Such a medium may take many forms, including, but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 806 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 800 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

The above described embodiments of the present disclosure are presented for purposes of illustration and not of limitation, and the present disclosure is limited only by the claims which follow.

What is claimed is:

1. A method for reducing jitter in a write strategy for an optical drive, comprising:
   recording a pattern on an optical medium according to a first write strategy;
   measuring edge timings corresponding to the pattern recorded on the optical medium;
   determining edge timing sensitivities based at least in part on the measured edge timings;
   calculating at least one derivative of an error function based on the edge timing sensitivities; and
   determining a second write strategy based on the at least one derivative of the error function, such that the second write strategy is associated with a second jitter amount less than a first jitter amount associated with the first write strategy.

2. The method of claim 1, wherein determining the second write strategy comprises optimizing the error function based at least in part on the edge timing sensitivities.

3. The method of claim 2, wherein the calculating the at least one derivative comprises:
   calculating a first order derivative of the error function with respect to the edge timing sensitivities; and
   calculating a second order derivative of the error function with respect to the edge timing sensitivities.

4. The method of claim 2, wherein optimizing the error function comprises identifying a minimum of the error function.

5. The method of claim 2, further comprising predicting the second jitter amount based on the optimizing of the error function.

6. The method of claim 1, wherein the edge timing sensitivities each indicate a predicted effect of a timing modification to a first edge timing on a second edge timing.

7. The method of claim 6, wherein the edge timing sensitivities are represented as elements in a matrix with the first edge timing along a first matrix dimension and the second edge timing along a second matrix dimension.

8. The method of claim 1, wherein the edge timing sensitivities are each characterized by at least two preceding portions and two following portions, each preceding portion and following portion corresponding to a mark or a space on the optical medium.

9. The method of claim 1, wherein the edge timing sensitivities are each characterized by a polarity of the measured edge timings.

10. The method of claim 1, wherein determining the second write strategy comprises optimizing a cost function in accordance with:

$$\sum_{p=0}^{1} \sum_{ijkl=start}^{end} n_{pijkl}(E_{pijkl})^2 + \sum_{p=0}^{1} \sum_{ijkl=start}^{end} N_{pijkl}(\sigma_{pijkl})^2$$

where
p denotes a polarity parameter of an edge;
(I,j,k,l) denote run length parameters associated with the edge;
$N_{pijkl}$ denotes a number of edges with parameters (p,i,j,k,l);

$$\sum_{ijkl=start}^{end} x_{ijkl} \text{ denotes } \sum_{i=start}^{end} \sum_{j=start}^{end} \sum_{k=start}^{end} \sum_{l=start}^{end} x_{ijkl};$$

$E_{pijkl}$ denotes a mean measured position of the $N_{pijkl}$ edges; and
$\sigma_{pijkl}$ denotes a standard deviation of the $N_{pijkl}$ edges.

11. The method of claim 1, wherein the error function is a mean-squared phase error (MSPE) function that represents the jitter.

12. A system for reducing jitter in a write strategy for an optical drive, comprising:
- a recording unit configured to record a pattern on an optical medium according to a first write strategy; and
- a processor configured to:
  - measure edge timings corresponding to the pattern recorded on the optical medium;
  - determine edge timing sensitivities based at least in part on the measured edge timings;
  - calculate at least one derivative of an error function based on the edge timing sensitivities; and
  - determine a second write strategy based on the at least one derivative of the error function, such that the second write strategy is associated with a second jitter amount less than a first jitter amount associated with the first write strategy.

13. The system of claim 12, wherein the processor determines the second write strategy by optimizing the error function based at least in part on the edge timing sensitivities.

14. The system of claim 13, wherein the processor calculates the at least one derivative by:
- calculating a first order derivative of the error function with respect to the edge timing sensitivities; and
- calculating a second order derivative of the error function with respect to the edge timing sensitivities.

15. The system of claim 13, wherein the processor optimizes the error function by identifying a minimum of the error function.

16. The system of claim 13, wherein the processor is further configured to predict the second jitter amount based on the optimizing of the error function.

17. The system of claim 12, wherein the edge timing sensitivities each indicate a predicted effect of a timing modification to a first edge timing on a second edge timing.

18. The system of claim 17, wherein the edge timing sensitivities are represented by elements in a matrix with the first edge timing along a first matrix dimension and the second edge timing along a second matrix dimension.

19. The system of claim 12, wherein the edge timing sensitivities are each characterized by at least two preceding portions and two following portions, each preceding portion and following portion corresponding to a mark or a space on the optical medium.

20. The system of claim 12, wherein the edge timing sensitivities are each characterized by a polarity of the measured edge timings.

21. The system of claim 12, wherein the second write strategy is determined by optimizing a cost function in accordance with:

$$\sum_{p=0}^{1} \sum_{ijkl=start}^{end} N_{pijkl}(E_{pijkl})^2 + \sum_{p=0}^{1} \sum_{ijkl=start}^{end} N_{pijkl}(\sigma_{pijkl})^2$$

where
- p denotes a polarity parameter of an edge;
- (i,j,k,l) denote run length parameters associated with the edge;
- $N_{pijkl}$ denotes a number of edges with parameters (p,i,j,k,l);

$$\sum_{ijkl=start}^{end} x_{ijkl} \text{ denotes } \sum_{i=start}^{end} \sum_{j=start}^{end} \sum_{k=start}^{end} \sum_{l=start}^{end} x_{ijkl};$$

- $E_{pijkl}$ denotes a mean measured position of the $N_{pijkl}$ edges; and
- $\sigma_{pijkl}$ denotes a standard deviation of the $N_{pijkl}$ edges.

22. The system of claim 12, wherein the error function is a mean-squared phase error (MSPE) function that represents the jitter.

* * * * *